(12) United States Patent
Minne

(10) Patent No.: US 8,671,262 B2
(45) Date of Patent: Mar. 11, 2014

(54) SINGLE-PORT MEMORY WITH ADDRESSES HAVING A FIRST PORTION IDENTIFYING A FIRST MEMORY BLOCK AND A SECOND PORTION IDENTIFYING A SAME RANK IN FIRST, SECOND, THIRD, AND FOURTH MEMORY BLOCKS

(75) Inventor: Cedric Minne, Grenoble (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 280 days.

(21) Appl. No.: 13/221,587

(22) Filed: Aug. 30, 2011

(65) Prior Publication Data

US 2012/0054464 A1 Mar. 1, 2012

(30) Foreign Application Priority Data

Aug. 31, 2010 (FR) ...................................... 10 56876

(51) Int. Cl.
*G06F 12/00* (2006.01)
*G06F 13/00* (2006.01)

(52) U.S. Cl.
USPC ........... 711/170; 711/171; 711/172; 711/173; 711/149; 711/150; 711/165; 711/202; 711/211; 365/189.04; 365/230.01; 365/230.03

(58) Field of Classification Search
USPC ......... 711/170, 171, 172, 173, 149, 150, 165, 711/202, 211; 365/189.04, 230.01, 230.03
See application file for complete search history.

(56) References Cited

U.S. PATENT DOCUMENTS

| | | |
|---|---|---|
| 2004/0221129 A1 | 11/2004 | Ko et al. |
| 2005/0091465 A1 | 4/2005 | Andreev et al. |
| 2008/0005516 A1* | 1/2008 | Meinschein et al. .......... 711/165 |
| 2008/0080261 A1* | 4/2008 | Shaeffer et al. .......... 365/189.05 |
| 2009/0063896 A1* | 3/2009 | Lastras-Montano et al. ..... 714/8 |
| 2011/0167316 A1* | 7/2011 | Paumier ........................ 714/755 |

* cited by examiner

*Primary Examiner* — Hong Kim
(74) *Attorney, Agent, or Firm* — Seed IP Law Group PLLC

(57) ABSTRACT

A memory and a method for controlling a memory including: a set of first memory blocks of identical size, intended to contain first words, a set of second memory blocks of identical size, intended to contain second words, the number of second words being identical to the number of first words, a third memory block identical to the first blocks, a fourth memory block identical to the second blocks, each memory address comprising a first portion identifying a same line in all blocks, and each first word of the third block identifying a free word from among the second words sharing a same second address portion.

17 Claims, 4 Drawing Sheets

SINGLE-PORT MEMORY WITH ADDRESSES HAVING A FIRST PORTION IDENTIFYING A FIRST MEMORY BLOCK AND A SECOND PORTION IDENTIFYING A SAME RANK IN FIRST, SECOND, THIRD, AND FOURTH MEMORY BLOCKS

BACKGROUND

1. Technical Field

The present disclosure generally relates to devices and methods for controlling accesses to memories, be they stand-alone memories or memories embedded in electronic circuits comprising other functions such as, for example, circuits for controlling digital data transmission networks or image processing circuits.

2. Description of the Related Art

Generally, electronic circuits have a significant data storage capacity. Such a capacity is reached with large memories formed of several memory blocks for physical or logical reasons. For example, such memories are of SRAM (Static Random-Access Memory) or DRAM (Dynamic Access Memory) type only. A memory controller enables the other functions of the electronic circuit to see all the memory blocks as a single memory, in terms of address.

Generally, the memory blocks have a single-port architecture. In other words, as seen from the other electronic circuit functions, a single-port block can only perform one read operation or one write operation at the same time. This memory block architecture enables avoiding too complex memory architectures, or architectures consuming too much circuit surface area. However, it may sometimes be desirable for some functions of the electronic circuit to simultaneously perform a read operation and a write operation, with no address constraint.

A known solution to this problem is to use dual-port memories capable of performing two operations at the same time. The disadvantages of dual-port memories are their low densities and high access times. Such memories are thus poorly adapted to the storage of large data words.

Another known solution to this problem is to use memory blocks performing operations at a clock frequency at least double that of the external circuit. A disadvantage of this solution is that memory blocks withstanding a high frequency must be available and that such blocks take up a large surface area. Another disadvantage of such a solution is that the circuit must be designed to be able to operate with several clock frequencies.

Another known solution to this problem is to delay conflicting operations, such as a simultaneous reading from and writing into the same memory block. A disadvantage of this solution is that an additional memory space must be available to temporarily store the data to be written which have caused the conflict. To be protected against the worst case, for which each address of a memory block will be successively read, and then written, this additional memory space must have the same size as the initial memory. Another disadvantage of this solution is that the processing (writing) of the data stored in the additional memory space may block the access to the memory for a given time period.

BRIEF SUMMARY DISCLOSURE

One embodiment of the present disclosure is a memory formed of a controller and several memory blocks overcoming all or part of the disadvantages of known devices.

One embodiment can perform simultaneous operations in single-port memory blocks.

One embodiment of the present disclosure provides a memory comprising:
 a set of first memory blocks of identical size, intended to contain first words,
 a set of second memory blocs of identical size, intended to contain second words, the number of second words being identical to the number of first words,
 a third memory block identical to the first blocks, and
 a fourth memory block identical to the second blocks,
 each address of the memory comprising a first portion identifying a first block and a second portion identifying a same line in all blocks, and each first word of the third block identifying a free word among the second words sharing a same second address portion.

The present disclosure also provides a method for controlling a memory comprising, in case of a simultaneous reading and writing, a step of comparison of first words.

The present disclosure also provides a control method further comprising a step of reading from the third block identifying a block containing a free word, from among the second and fourth blocks.

The present disclosure also provides a control method further comprising a step of updating the words contained in the first and third memory blocks.

The present disclosure also provides a method for controlling a memory in which said comparison step is carried out before said reading step.

The present disclosure also provides a method for controlling a memory in which, if the first words of said comparison step are equal, a word is written at a free address of one of the second and fourth blocks.

The foregoing and other features and advantages of the present disclosure will be discussed in detail in the following non-limiting description of specific embodiments in connection with the accompanying drawings.

DETAILED DESCRIPTION

Figure 1:
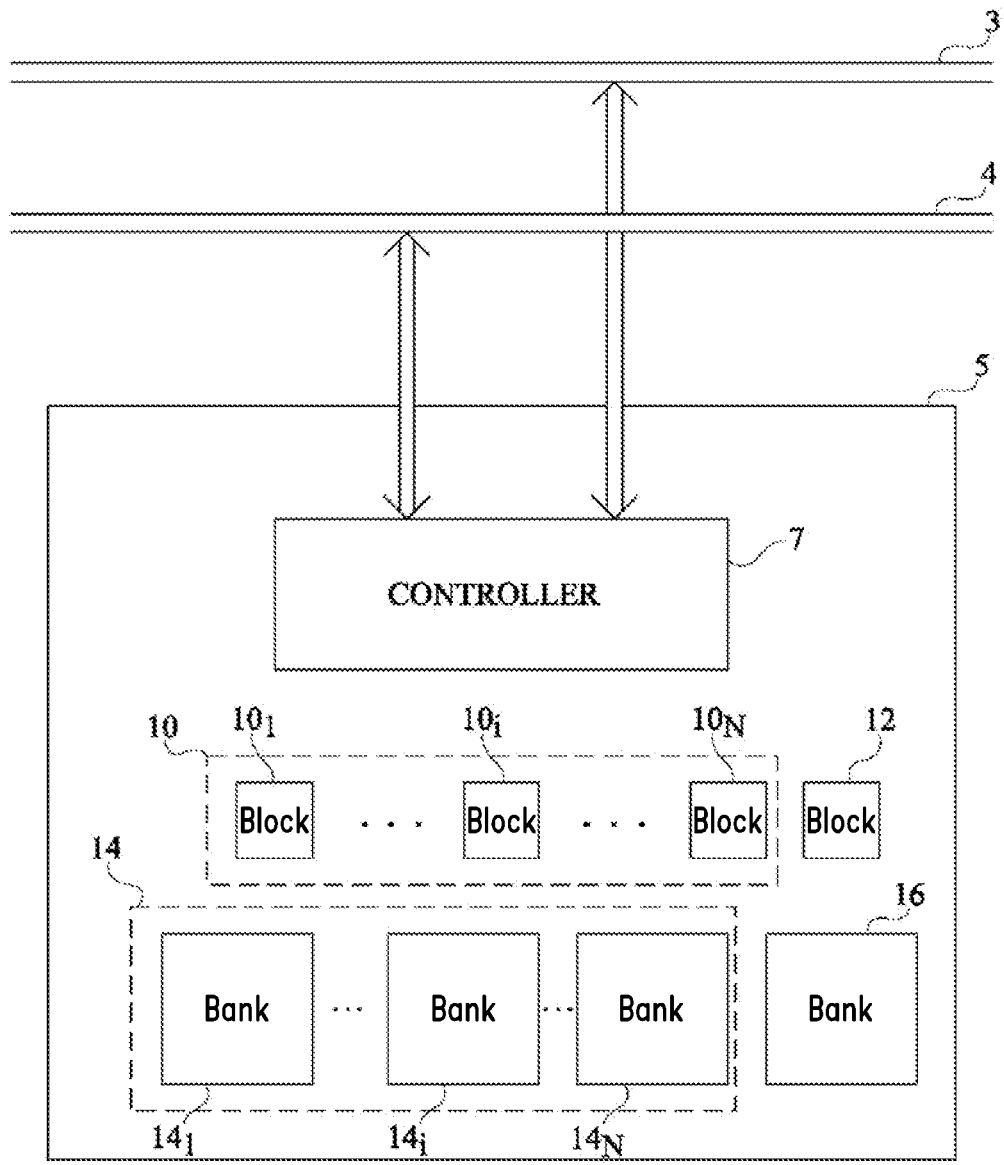
FIG. 1 very schematically shows in the form of blocks an example of a device for managing the accesses to single-port memory blocks.

The same elements have been designated with the same reference numerals in the different drawings, which have been drawn out of scale. For clarity, only those steps and elements which are useful to the understanding of the present disclosure have been shown and will be described.

FIG. 1 shows in the form of blocks a memory 5 comprising:
 a controller 7 (CONTROLLER);
 a set 10 of first memory blocks $10_i$ (with i ranging between 1 and N), of identical size, configured to store address look-up tables, respectively, each table containing address words;

a set 14 of banks (second single-port memory blocks) 14$_i$ (with i ranging from 1 to N), of identical size, each bank containing data words by a number identical to the number of address words of a corresponding one of the look-up tables;

a third memory block 12, configured to store an additional address look-up table, identical to the first memory blocks 10$_i$; and an additional bank 16 (fourth memory block) identical to banks 14$_i$.

Controller 7 is, for example, connected to circuits performing the other functions by address and data buses 3 and 4, to which one or several control buses are added. Controller 7 may also perform the address coding and decoding operations to access the banks and the tables.

The number of data words in a bank and the number of address words in a table are identical.

The first and third memory blocks 10$_i$, 12, for example, single-port memory blocks, cache memories, etc. Banks 14$_i$ and 16 are formed of second and fourth single-port memory blocks.

Figure 2:
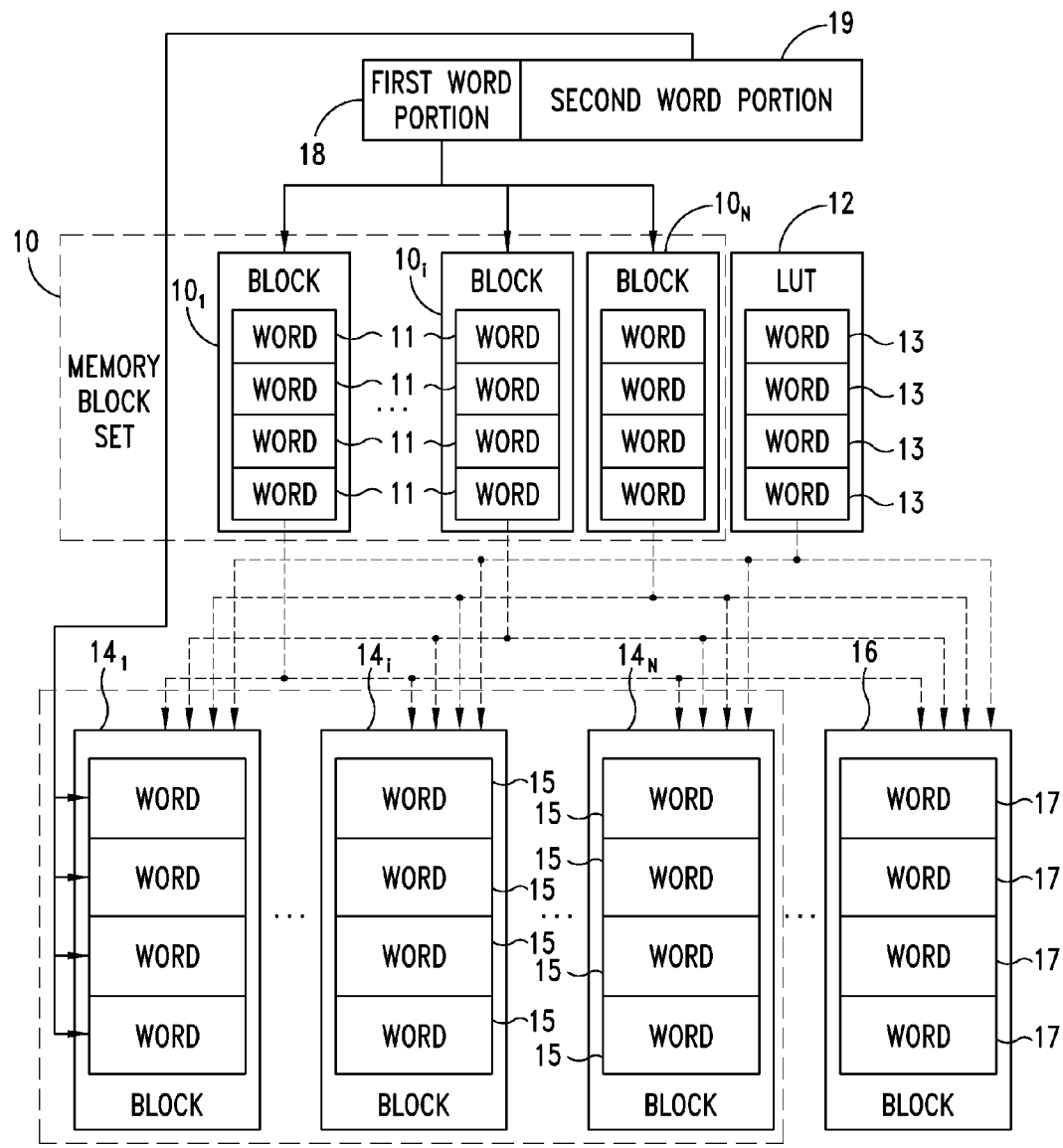
FIG. 2 illustrates, by means of blocks, an addressing architecture for the memory of FIG. 1.

FIG. 2 is a more detailed representation of the memory blocks and an addressing architecture in memory 5 according to an embodiment of the present disclosure.

Each first memory block 10$_i$ including a set of address word locations 11 configured to respectively store the address words of the look-up table stored in the first memory block 10$_i$. Each second memory block 14$_i$ includes a number of data word locations 15, identical to the number of address word locations 11 in one of the memory blocks 10$_i$, that are configured to respectively store the data words of the second memory block 14$_i$. The third memory block 12 includes the same number of address word locations 13 as the address word locations 11 in each of the first memory blocks 10$_i$. The fourth memory block 16 includes the same number of data word locations 17 as the data word locations 15 in each of the banks 14$i$.

It will be appreciated that the terms word, block, and banks are not intended to be limited to any particular size or type of memory. Also, FIG. 2 shows each address word location 11, 13 and data word location 15, 17 as being a separate line of its memory block, but such an architecture is not required. However, the depiction in FIG. 2 allows one to immediately appreciate address and data words of same rank in the banks and the tables.

The address of a data word stored in memory 5 and manipulated by other functions of the electronic circuit is formed of two portions 18 and 19. This address will be designated hereafter as the external address (memory address). A first portion 18 identifies one of the first memory blocks 10$_i$. A second portion 19 identifies a same rank among memory blocks 10$_i$, 12 and banks 14$_i$ and 16. In other words, the data originating from portion 18 designates an address look-up table and the data originating from portion 19 designates a rank common to the address look-up tables and to the banks. The full address word thus defines the position of a data word in a bank 14$_i$ or 16.

A large storage space accessible from the outside as a single memory, but actually formed of several blocks, for technical reasons, is desired to be formed. As seen from the outside, it is desired to have a memory standing simultaneous read and write operations, based on single-port blocks only.

According to an embodiment of the present disclosure, the addition of an additional memory block 16 provides an additional storage capacity having the size of a bank. The addition of additional address look-up table 12 enables to identify the number of the bank from among banks 14$_i$ and 16 containing a free location (free word) for a given line.

Figure 3:
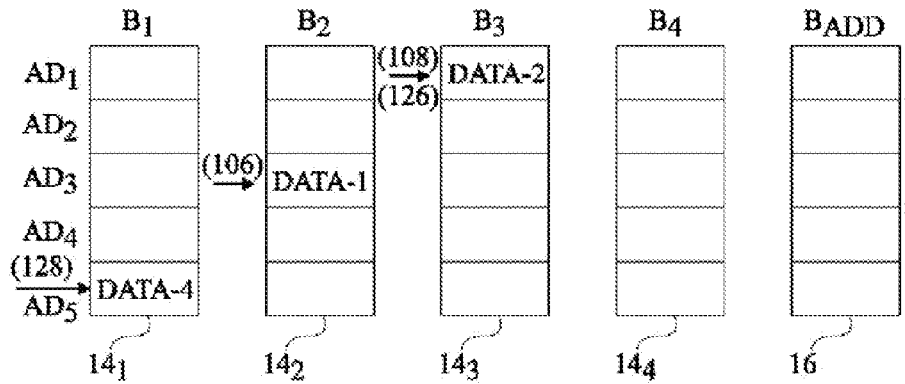
FIGS. 3, 3A, and 3B illustrate, in the form of blocks, examples of read and write operations in a memory of the type of that in FIG. 2.
Figure 3A:
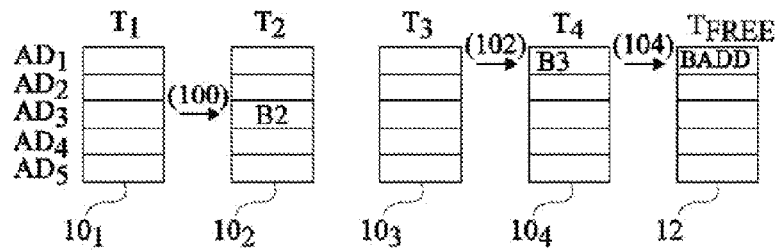
Figure 3B:
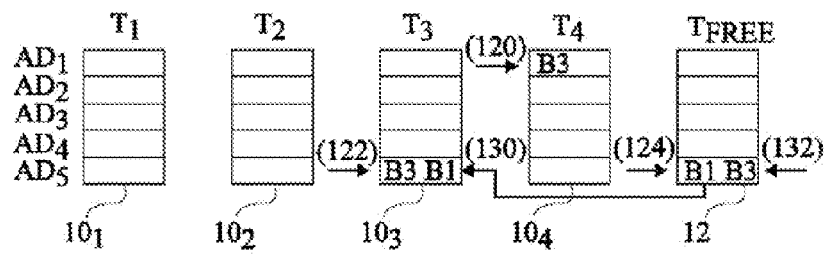

FIGS. 3, 3A, and 3B illustrate an embodiment of the present disclosure with a memory formed of:

four banks 14$_x$, with x ranging between 1 and 4 and arbitrarily identifying a bank (14$_1$ to 14$_4$ or B$_1$ to B$_4$);

four address tables T$_1$ to T$_4$ in memory blocks 10$_y$, with y ranging between 1 and 4 and arbitrarily identifying memory blocks 10$_1$ to 10$_4$;

an additional bank 16 (B$_{ADD}$); and an additional address look-up table T$_{FREE}$ in the additional memory block 12.

Each of the banks and of the tables comprises five lines, respectively identified with addresses AD$_p$, with p ranging between 1 and 5 (AD$_1$ to AD$_5$).

FIGS. 3 and 3A describe an example of simultaneous read and write operations, with no bank collision, according to an embodiment of the present disclosure. FIG. 3 illustrates the operations affecting the banks. FIG. 3A illustrates the operations affecting the tables.

For example, the two following operations are performed simultaneously:

reading the data located at external address T$_2$, AD$_3$, at which data DATA-1 have been previously stored; and writing data DATA-2 at external address T$_4$, AD$_1$.

In a first so-called acquisition cycle:

table T$_2$ is read from at address AD$_3$ (step 100) to prepare the read operation, and B$_2$ is obtained;

table T$_4$ is then read from at address AD$_1$ (step 102) to prepare the write operation, and B$_3$ is obtained; and table T$_{FREE}$ is then read from at address AD$_1$ (step 104) to have the number of the bank containing a free location on line AD$_1$, and B$_{ADD}$ is obtained.

Since bank B$_2$ resulting from step 100 is distinct from bank B$_3$ resulting from step 102, the operations generate no collision.

In a second so-called execution cycle:

bank B$_2$ is read from at address AD$_3$ (step 106), and data DATA-1 are obtained; and data DATA-2 are written into B$_3$ at address AD$_1$ (step 108).

FIG. 3B illustrates, in relation with FIG. 3, an example of simultaneous read and write operations, with a bank collision. FIG. 3B illustrates the operations affecting the tables.

For example, the two following operations are performed simultaneously:

reading data located at external address T$_4$, AD$_1$, at which data DATA-2 have been previously stored; and writing data DATA-4 at external address T$_3$, AD$_5$.

In the acquisition cycle:

table T$_4$ is read from at address AD$_1$ (step 120) to prepare the read operation, and B$_3$ is obtained;

table T$_3$ is then read from at address AD$_5$ (step 122) to prepare the write operation, and B$_3$ is obtained; and table T$_{FREE}$ is then read from at address AD$_5$ (step 124) to obtain the number of the bank containing a free location at address AD$_5$, and B$_1$ is obtained.

Since the numbers of the banks resulting from steps 120 and 122 are identical, a collision is detected.

In the execution cycle:

bank B$_3$ is read from at address AD$_1$ (step 126), and data DATA-2 are obtained;

data DATA-4 are written into bank B$_1$ at address AD$_5$ (step 128);

In a third so-called address look-up table updating cycle:

the number of bank B$_1$ is written into table T$_3$ at address AD$_5$ (step 130);

the number of bank $B_3$ is written into table $T_{FREE}$ at address $AD_5$ (step 132).

The address coding and decoding, read, and write operations are performed by controller 7.

As a variation, the third cycle may be systematically carried out, at the cost of an additional writing, sometimes unnecessary, to update the address look-up tables.

As another variation, and to avoid a sometimes unnecessary read operation, table $T_{FREE}$ may be read from only if a collision is detected in the first cycle.

Figure 4:
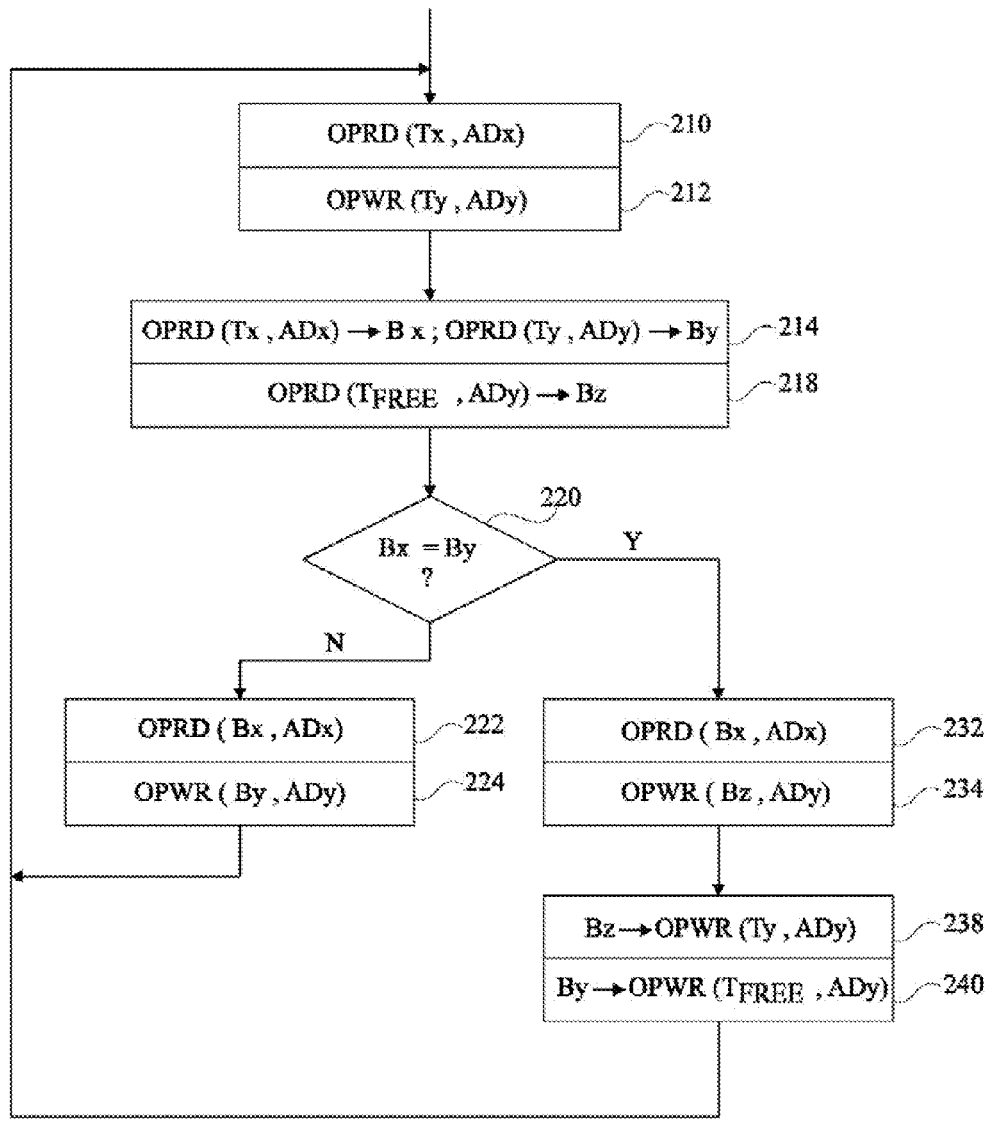
FIG. 4 shows an example of a flowchart describing an embodiment of a chaining of the sequences executed by the memory according to an embodiment of the present disclosure.

FIG. 4 shows a flowchart describing an example of a sequence of steps executed by memory 5 to perform simultaneous operations.

The type of operation (read, write) to be performed in memory 5 and the corresponding addresses are communicated thereto during steps 210 and 212. At steps 210 (OPRD $(T_x, AD_x)$) and 212 (OPWR$(T_y, AD_y)$), memory 5 receives the order of simultaneously executing a read operation OPRD from table $T_x$ at address $AD_x$ and a write operation OPWR into table $T_y$ at address $AD_y$. These operations and addresses are decoded by controller 7 to access tables $10_i$, 12 and banks $14_i$ and 16.

The acquisition cycle takes place at steps 214 (OPRD($T_x$, $AD_x$)→$B_x$; OPRD($T_y$, $AD_y$)→$B_y$) and 218 (OPRD($T_{FREE}$, $AD_y$)→$B_z$) to identify the numbers of the corresponding banks. At step 214, table $T_x$ is read from at address $AD_x$ and $B_x$ is obtained. Then, table $T_y$ is read from at address $AD_y$ and $B_y$ is obtained. Step 218 of reading from table $T_{FREE}$ at address $AD_y$ provides the number of the free bank $B_x$ (with Z ranging between 1 and 5) containing the location of a free data word (free word) for this address (free address).

In a comparison step 220 ($B_x=B_y$?), the ranks of the banks obtained at step 214 are compared.

If this rank is different (output N of step 220), each operation is performed simultaneously in different banks, with no risk of collision.

In this case, the execution cycle comprises a step 222 (OPRD($B_x$, $AD_x$)) of reading a data word from bank $B_x$ at address $AD_x$, and a step 224 (OPWR($B_y$, $AD_y$)) of writing a data word into bank $B_y$ at address $AD_y$. The process can then return to step 210.

If the numbers of the banks compared at step 220 are identical (output Y), a collision is detected. The two operations should be performed in the same bank, which cannot be achieved with single-port memory blocks. The sequence then carries on with an execution cycle.

The execution cycle comprises a data word reading step 232 (OPRD($B_x$, $AD_x$)) identical to step 222. A data word writing step 234 (OPWR($B_z$, $AD_y$)) is performed into free bank $B_z$ (obtained at step 218) at address $AD_y$.

The address look-up table updating cycle enables, at a step 238 ($B_z$→OPWR($T_y$, $AD_y$)), to keep the new number of the bank where the data word previously described at step 234 is stored. The number of bank $B_z$ is thus written into table $T_y$ at address $AD_y$. At a step 240 ($B_y$→OPWR($T_{FREE}$, $AD_y$)), the new free bank number for address $AD_y$ ($B_y$ in this example) is written into table $T_y$. The process can then return to step 210.

In certain cases, the accesses to the tables may result in collisions. For example, simultaneous accesses to a same table in read and write mode will be impossible. A solution is to perform a write operation, followed by read operations on the other tables at the address of said read operation. An incomplete list of the bank numbers will be obtained. The set of bank numbers is finite and known, and the missing bank number can then easily be deduced therefrom. This missing bank number is the result of said read operation.

The memory described in the above embodiment has the advantage of being seen as a dual-port memory while it keeps the advantage of the surface area of single-port memory blocks.

Another advantage of the described embodiment is that it enables two simultaneous write operations if the designated banks and lines are different.

Another advantage of the described embodiment is the absence of delayed conflicting operations to be processed subsequently.

Specific embodiments of the present disclosure have been described. Various alterations and modifications will occur to those skilled in the art. In particular, various embodiments with different variations have been described hereabove. It should be noted that those skilled in the art may combine various elements of these various embodiments and variations.

Such alterations, modifications, and improvements are intended to be part of this disclosure, and are intended to be within the spirit and the scope of the present disclosure. Accordingly, the foregoing description is by way of example only and is not intended to be limiting.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A memory comprising:
    a set of first memory blocks of identical size, configured to contain a number of first words;
    a set of second memory blocks of identical size, configured to contain a number of second words, the number of second words being identical to the number of first words;
    a third memory block identical in size to each of the first memory blocks; and
    a fourth memory block identical in size to each of the second memory blocks,
    wherein each address of the memory comprises a first portion identifying one of the first memory blocks and a second portion identifying a same rank in the first, second, third, and fourth memory blocks, each word of the third memory block identifying a free location, among the second and fourth memory blocks, sharing a same second address portion.

2. The memory of claim 1, further comprising a controller configured to simultaneously perform read and write operations having first and second addresses, respectively, by steps including:
    reading from the first memory blocks respective first words corresponding to the first and second addresses; and
    determining whether a collision exists by comparing the first words corresponding to the first and second addresses.

3. The memory of claim 2, wherein the controller is configured to read from the third memory block a word identifying a free location in one of the second and fourth memory blocks.

4. The memory of claim 3, wherein the controller is configured to, if a collision is determined to exist, write a data word into the free location.

5. The memory of claim 4, wherein the controller is configured to update the third memory block with the first word corresponding to the second address and update the first memory blocks with the word identifying the free location in the second and fourth memory blocks.

6. The memory of claim 3, wherein the controller is configured to, after comparing the first words corresponding respectively to the first and second addresses, read from one of the second memory blocks a second word pointed to by the first word corresponding to the first address.

7. A method, comprising:
controlling a memory that includes a set of first memory blocks of identical size, configured to contain a number of first words; a set of second memory blocks of identical size, configured to contain a number of second words, the number of second words being identical to the number of first words; a third memory block identical in size to each of the first memory blocks; and a fourth memory block identical in size to each of the second memory blocks, wherein each address of the memory comprises a first portion identifying one of the first memory blocks and a second portion identifying a same rank in the first, second, third, and fourth memory blocks, each word of the third memory block identifying a free location, among the second and fourth memory blocks, sharing a same second address portion, the controlling including concurrently performing reading and writing operations having first and second addresses, respectively, by steps including:
reading from the first memory blocks respective first words corresponding to the first and second addresses; and
determining whether a collision exists by comparing the first words corresponding to the first and second addresses.

8. The method of claim 7, wherein performing the reading operation includes reading from the third memory block a word identifying a free location in one of the second and fourth memory blocks.

9. The method of claim 8, wherein performing the writing operation includes, if a collision is determined to exist, writing a data word into the free location.

10. The method of claim 9, further comprising updating the first memory blocks with the word identifying the free location in the second and fourth memory blocks and updating the third memory block with the first word corresponding to the second address.

11. The method of claim 8, wherein performing the reading operation includes, after comparing the first words corresponding respectively to the first and second addresses, read from one of the second memory blocks a second word pointed to by the first word corresponding to the first address.

12. A memory comprising:
a plurality of first memory blocks configured to store a plurality of look-up tables, respectively, each first memory block including a plural number of first locations;
a plurality of second memory blocks configured to store data words, each second memory block including a number of second locations equal to the number of first locations in each first memory block;
a third memory block configured to store a look-up table, the third memory block including a plurality of third locations equal to the number of first locations in each first memory block; and
a fourth memory block configured to store data words, the fourth memory block including a number of fourth locations equal to the number of second locations in each second memory block, wherein the first and third memory blocks are configured to store block identifiers respectively identifying corresponding memory blocks of the second and fourth memory blocks, and wherein each address of the memory comprises a first portion identifying one of the first memory blocks and a second portion identifying a same rank in the first, second, third, and fourth memory blocks.

13. The memory of claim 12, further comprising a controller configured to perform read and write operations having first and second addresses, respectively, by steps including:
reading, from first locations corresponding to the first and second addresses the first memory blocks, respective first and second block identifiers; and
determining whether a collision exists by comparing the first and second block identifiers.

14. The memory of claim 13, wherein the controller is configured to read from the third memory block a third block identifier identifying a free location in one of the second and fourth memory blocks.

15. The memory of claim 14, wherein the controller is configured to, if a collision is determined to exist, write a data word into the free location.

16. The memory of claim 15, wherein the controller is configured to update the third memory block with the second block identifier and update the first memory blocks with the third block identifier.

17. The memory of claim 13, wherein the controller is configured to, after comparing the first and second block identifiers, read from one of the second memory blocks a data word pointed to by the first block identifier.

\* \* \* \* \*